United States Patent
Asano et al.

(10) Patent No.: US 6,721,854 B1
(45) Date of Patent: Apr. 13, 2004

(54) CONTROLLER DEVICE, DISK CONTROLLER, AUXILIARY STORAGE, COMPUTER DEVICE, AND METHOD FOR CONTROLLING AUXILIARY STORAGE

(75) Inventors: Hideo Asano, Machida (JP); Atsushi Kanamaru, Sagamihara (JP); Kelvin Kao, San Jose, CA (US); Akira Kibashi, Zama (JP); Koichi Kushida, Fujisawa (JP); Takahiro Saito, Yokohama (JP); Chi-Chen Wu, Los Altos, CA (US); Daniel James Colegrove, Henderson, NV (US)

(73) Assignee: International Business Machines Corporation, Armonk, NY (US)

( * ) Notice: Subject to any disclaimer, the term of this patent is extended or adjusted under 35 U.S.C. 154(b) by 401 days.

(21) Appl. No.: 09/698,344

(22) Filed: Oct. 27, 2000

(30) Foreign Application Priority Data

Oct. 28, 1999 (JP) ............................................ 11-306605

(51) Int. Cl.⁷ ............................ G06F 12/00; G06F 13/00
(52) U.S. Cl. ........................ 711/137; 711/118; 711/213; 710/29
(58) Field of Search ................................. 711/118, 137, 711/213; 710/29; 712/237

(56) References Cited

U.S. PATENT DOCUMENTS

| | | | | | |
|---|---|---|---|---|---|
| 6,016,533 | A | * | 1/2000 | Tran | 711/128 |
| 6,101,577 | A | * | 8/2000 | Tran | 711/125 |
| 6,134,633 | A | * | 10/2000 | Jacobs | 711/137 |
| 6,341,334 | B1 | * | 1/2002 | Kamemaru | 711/137 |
| 6,446,143 | B1 | * | 9/2002 | Razdan et al. | 710/29 |

* cited by examiner

Primary Examiner—Reginald G. Bragdon
Assistant Examiner—Pierre M. Vital
(74) Attorney, Agent, or Firm—Abdy Raissinia; Bracewell & Patterson, L.L.P.

(57) ABSTRACT

An external controller performs a thorough analysis and prediction on true requests from an application to issue a look-ahead request to an HDD or other auxiliary storage. An HDC card is connected to an HDD device which stores data and has a cache memory. The HDC card, which controls the HDD device, includes an access request tracer for tracing a true access request made by an application program executed by a host directly from the application program, a speculation request determination section for determining a speculation request to be expected later based on the traced true access request, and an HDC for issuing the determined speculation request to the HDD device.

13 Claims, 10 Drawing Sheets

| Register | 7 | 6 | 5 | 4 | 3 | 2 | 1 | 0 |
|---|---|---|---|---|---|---|---|---|
| Features | na | | | | | | | |
| Sector Count | Sector count | | | | | | | |
| Sector Number | Sector number or LBA | | | | | | | |
| Cylinder Low | Cylinder low or LBA | | | | | | | |
| Cylinder High | Cylinder high or LBA | | | | | | | |
| Device/Head | obs | LBA | obs | DEV | Head number or LBA | | | |
| Command | C8h or C9h | | | | | | | |

Fig. 5A

| Register | 7 | 6 | 5 | 4 | 3 | 2 | 1 | 0 |
|---|---|---|---|---|---|---|---|---|
| Features | Sector count | | | | | | | |
| Sector Count | Tag | | | | | na | na | na |
| Sector Number | Sector number or LBA | | | | | | | |
| Cylinder Low | Cylinder low or LBA | | | | | | | |
| Cylinder High | Cylinder high or LBA | | | | | | | |
| Device/Head | obs | LBA | obs | DEV | Head number or LBA | | | |
| Command | C7h | | | | | | | |

Fig. 5B

| b7 | b6 | b5 | b4 | b3 | b2 | b1 | b0 |
|---|---|---|---|---|---|---|---|
| Reserved | Reserved | Reserved | Reserved | Reserved | SRST | nIEN | 0 |

*Fig. 6A*

| Register | 7 | 6 | 5 | 4 | 3 | 2 | 1 | 0 |
|---|---|---|---|---|---|---|---|---|
| Features | Subcommand code ||||||||
| Sector Count | Tag ||||| na | na | na |
| Sector Number | Na ||||||||
| Cylinder Low | Na ||||||||
| Cylinder High | Na ||||||||
| Device/Head | obs | na | obs | DEV | na | na | na | na |
| Command | 00h ||||||||

*Fig. 6B*

| Code | Description | Action |
|---|---|---|
| 00h | NOP | To cancel all queued command |
| 01h | NOP Auto POLL | To do nothing |
| 02h | NOP Selection POLL | To cancel a specified tag |
| 03h-FFh | Reserved | To do nothing |

| Register | Contents |
|---|---|
| LBA | 0 |
| Sector Count | 10 |
| Command | C8h |

*Fig. 8A*

| Register | Contents |
|---|---|
| LBA | 100 |
| Sector Count | 10 |
| Command | C8h |

*Fig. 8B*

| Register | Contents |
|---|---|
| LBA | 10 |
| Sector Count | 10 |
| Command | C8h |

*Fig. 8C*

| Register | Contents |
|---|---|
| LBA | 110 |
| Sector Count | 50 |
| Command | C8h |

*Fig. 8D*

| Register | Contents |
|---|---|
| Device Control | bit3 : 1 |

*Fig. 8E*

| Register | Contents |
|---|---|
| LBA | 20 |
| Sector Count | 10 |
| Command | C8h |

*Fig. 8F*

| Register | Contents |
|---|---|
| Features | 10 |
| Sector Count | 08h(Tag:1) |
| LBA | 0 |
| Command | C7h |

*Fig. 9A*

| Register | Contents |
|---|---|
| Features | 10 |
| Sector Count | 10h(Tag:2) |
| LBA | 100 |
| Command | C7h |

*Fig. 9B*

| Register | Contents |
|---|---|
| Features | 10 |
| Sector Count | 18h(Tag:3) |
| LBA | 10 |
| Command | C7h |

*Fig. 9C*

| Register | Contents |
|---|---|
| Features | 50 |
| Sector Count | 20h(Tag:4) |
| LBA | 110 |
| Command | C7h |

*Fig. 9D*

| Register | Contents |
|---|---|
| Feature | 02h |
| Sector Count | 20h(Tag:4) |
| Command | 00h |

*Fig. 9E*

| Register | Contents |
|---|---|
| Features | 10 |
| Sector Count | 28h(Tag:5) |
| LBA | 20 |
| Command | C7h |

CONTROLLER DEVICE, DISK CONTROLLER, AUXILIARY STORAGE, COMPUTER DEVICE, AND METHOD FOR CONTROLLING AUXILIARY STORAGE

BACKGROUND OF THE INVENTION

1. Technical Field

The present invention relates to a computer device with an auxiliary storage or a control method therefor, and in particular, to a device or method to enhance the overall system performance by using a cache memory.

2. Description of the Related Art

A recent computer system includes a CPU, a system memory, and auxiliary storage (external storage) represented by an HDD (Hard Disk Drive), and each of these components has a different data rate. When considering the performance of such a computer system, it is found that the HDD and other auxiliary storage are much slower than the CPU and the system memory in terms of data rate. Since the data rate of the overall system generally depends on the slower devices, any delay in these auxiliary storage devices may cause a bottleneck in the overall system performance.

To reduce a difference in speed between these devices to increase the processing speed, a computer system typically has a cache memory provided therein. The cache memory is placed, for example, between the CPU and a main storage, and any data or instruction used by the CPU once is retained in the cache memory, which is faster than the main storage. For subsequent uses, such data or instruction is read out from the cache memory and is not placed directly into the main storage to provide faster processing.

In addition, the HDD as an auxiliary storage (external storage) has a cache memory provided therein to hold some of the data stored in its magnetic disks (media) and is configured to improve its basic performance and to minimize the number of accesses to the slower media by prestoring in the cache memory some data which is expected to be requested later. When the data to be requested is thus prestored in the cache memory, the access time for the HDD does not cause a bottleneck in the overall system performance.

To predict data to be requested later, a data read-ahead algorithm called "Look Ahead" is most commonly used. The "Look Ahead" algorithm is a technique of prereading some data subsequent to the requested data (some data at larger addresses than the requested address), that is, a technique of reading some data in the area contiguous to the requested data after the data requested by a host device has been read out from the requested area.

The "Look Ahead" algorithm can minimize overhead required for processing by always prereading subsequent data, regardless of the previous request patterns. To really improve the performance through this technique, it is ideal to analyze the pattern of requests from an application or OS thoroughly for accurate prediction of subsequent requests.

An auxiliary storage represented by an HDD traces which commands have been issued and easily predicts which data are to be access-requested next. Therefore, the HDD is configured to improve the performance by prestoring thus predicted data in its internal cache memory. However, a request issued to, for example, an HDD is not a true request from the application or OS but is actually a request pattern, modified by collecting or rearranging several access requests through a hard disk controller (HDC). Thus, the HDD cannot analyze the true request pattern and it is difficult to increase the cache hit rate for reading.

An internal controller provided within the HDD or other auxiliary storage must trace commands from the host while controlling read/write accesses to a medium, which is the original task. Therefore, a thorough analysis or parsing on the pattern of requests from the application or OS may impose too large loads on the internal controller and it is indeed difficult to carry out such a thorough analysis or parsing.

SUMMARY OF THE INVENTION

The present invention has been made to solve the technical problems as described above, and it is an object of the present invention to cause the HDD or other auxiliary storage to cooperate with the HDC or other external controller in improving the overall system performance.

It is another object of the present invention to carry out a thorough analysis or parsing through the external controller based on a true request from the application or OS and to pre issue to the auxiliary storage a "speculation" request based on a true "prediction."

It is still another object of the present invention to provide a mechanism to cancel a request being executed or an unexecuted request to minimize a possible performance deterioration which may result from a wrong prediction.

To attain these and other objects, a controller device according to an embodiment of the present invention is provided between auxiliary storage which stores data and a host device which makes an access request for access to the auxiliary storage. The controller device, which controls the auxiliary storage, comprises access request storage means for storing past access requests made by the host device, look-ahead request output means for providing to the auxiliary storage a look-ahead request for some data which is expected to be access-requested later based on the past access requests stored by the access request storage means, and cancel signal output means for providing to the auxiliary storage a cancel signal to cancel a particular look-ahead request among the look-ahead requests provided by the look-ahead request output means.

This controller device may take the form of, for example, a hard disk controller card (HDC card) provided between a PC, or host and a hard disk drive or other auxiliary storage. As an alternative form, the PC or host itself may have the function of this controller device so that the controller device is substantially provided between the host device and the auxiliary storage. The controller device may take any form if it can be discriminated from an internal controller provided in the auxiliary storage.

It is preferable that a look-ahead request for data provided by the look-ahead request output means is a non queue request that is executed immediately or a tagged queue request that is temporarily held in the auxiliary storage in a queue, since this can allow an optimal request to be transmitted to the auxiliary storage according to a predicted command.

In particular, it is advantageous that a cancel signal provided by the cancel signal output means is a cancel signal with a tag number to be canceled with respect to the tagged queue request, since this can allow an arbitrary command being executed to be canceled in order to improve the overall system performance.

Alternatively, a cancel signal provided by the cancel signal output means may be a command to extend a "No Operation" (NOP) command for an ATA-related interface with a tag number to be cancelled as an argument.

In addition, a cancel signal provided by the cancel signal output means with respect to a command being executed may be a signal to suspend only the command being executed by using a blank bit in a device control register for the ATA-related interface to issue a soft reset.

It should be appreciated that the ATA (AT Attachment), related interface may include an associated ATAPI (ATA Packet Interface) or other extended protocol.

A disk controller according to another embodiment of the present invention is connected to a disk-shaped storage which stores data and has a cache memory. The disk controller, which controls the disk-shaped storage, comprises an access request tracer for tracing a true access request made by an application program executed by a host with respect to the disk-storage directly from the application program, a speculation request determination section for determining a speculation request to be expected later based on the true access request traced by the access request tracer, and an access request issuing section for issuing to the disk-shaped storage a speculation request determined by the speculation request determination section.

It is preferable that a "true access request" is not a request modified by collecting or rearranging several access requests, but an intact request from the application program, since this can improve the accuracy in prediction remarkably.

In addition, it is preferable that the access request tracer takes the form of a tracer which can store a plurality of access requests from the application program together with their order information to grasp the traces of the access requests.

It should be appreciated that the disk controller may take any form if it can be discriminated from an internal controller provided in the disk-shaped storage. It is advantageous that some of the tasks performed by the internal controller in the disk-shaped storage can be made over by discriminating between these controllers and thus much more excellent an analysis can be made on access request patterns.

It is also advantageous if the disk controller further comprises a cancel request determination section for determining a particular speculation request to be canceled among the speculation requests issued by the access request issuing section, and a cancel instruction issuing section for issuing to the disk-shaped storage a cancel instruction with respect to the particular speculation request determined by the cancel request determination section, since a request being executed or an unexecuted request can be canceled as required. A possible performance deterioration which may result from a wrong prediction can thus be minimized.

The speculation request issued by the access request issuing section may be a request to immediately read out data from a medium in the disk-shaped storage, and the cancel instruction issued by the cancel instruction issuing section may be an instruction to suspend the request being executed. This can allow quick cancellation of a request being executed in order to improve performance.

Alternatively, the speculation request issued by the access request issuing section may be a request for a command held in the disk-shaped storage in a queue with a tag number and the cancel instruction issued by the cancel instruction issuing section may be an instruction to cancel a request corresponding to a particular tag number among the requests in the queue. This can allow a plurality of requests to be placed in the "queue" and avoid any unnecessary access to an unexecuted request by deleting the request from the "queue" even when a prediction is wrong.

An auxiliary storage device according to still another embodiment of the present invention comprises a storage medium for storing data, a cache memory for temporarily accumulating data read out from the storage medium in response to executing a predicted read request, an interface for receiving from an external controller a predicted read request with respect to the cache memory with tag number information, and a controller for holding a plurality of unexecuted requests in a queue which includes the predicted read request received by the interface and identified by the tag number. The interface receives from the external controller a cancel signal with a particular tag number for a request to be canceled, and the controller analyzes the cancel signal and deletes a request corresponding to the particular tag number from the queue.

It should be appreciated that the controller can execute a plurality of requests in a different order from that of placing them in the "queue," taking account of the efficiency in executing them in the auxiliary storage in the order.

In addition, an unexecuted request can be canceled easily and a possible performance deterioration which may result from a wrong prediction of the external controller can be minimized.

It is further advantageous that the interface can notify the external controller which data of the data being read is valid if a request being executed is canceled, since the external controller can accurately determine the next predicted read request to be transmitted.

A computer device to which the present invention is applicable comprises a host for executing application programs, an external storage which has a cache memory, an internal controller for reading/writing data based on an access request from the host, and a controller for controlling the external storage. The controller provides to the external storage a look-ahead request for some data which is expected to be access-requested later based on the access request provided by the host. The controller also provides to the external storage a cancel signal to cancel the look-ahead request.

The look-ahead request may be a request to immediately read out data from a storage medium in the external storage to the cache memory and the cancel signal may be a signal to suspend a command being executed in response to the request. Alternatively, the look-ahead request may be a request for a command managed by the internal controller in the external storage with an identification number attached thereto, and the cancel signal may be a signal to specify a particular identification number for a command to be canceled among the commands managed by the internal controller.

In addition, it is preferable that the external storage analyzes the cancel signal provided by the controller to cancel a look-ahead request and provides to the controller the last valid data information indicating the end of valid data among the data written into the cache memory, since this can allow the controller to effectively take advantage of some of the data requested by a canceled request.

A control method for an auxiliary storage according to the present invention comprises the step of receiving a command issued by an application, the step of analyzing the flow of the command received from the application, the step of determining whether a speculation command is required to indicate data to be read ahead based on the flow of the analyzed command, the step of issuing the speculation command to the auxiliary storage if it is determined that the speculation command is required, the step of verifying previously issued speculation commands, and the step of issuing a cancel command to the auxiliary storage if it is determined from the verification result that there exists an unnecessarily issued speculation command.

It is preferable that the speculation command includes a request to immediately read out data from a medium in the auxiliary storage and the cancel command suspends the speculation command being executed, since this can allow a request being executed to be canceled properly.

The speculation command may include a request to be held in the auxiliary storage in a queue, and the cancel command may select a particular command among the commands held in the queue by the speculation command and delete it from the queue. Alternatively, the speculation command may include a request to be held with a tag number, and the cancel command may specify a tag number to be canceled, since the speculation command can be canceled by issuing a simple instruction with a tag number with respect to a tagged queue request held in the auxiliary storage in the form of a "queue."

It is also advantageous that the method further comprises the step of receiving from the auxiliary storage the last valid data information after a cancel operation is completed, since this can effectively take advantage of some data accessed previously, for example, in order to improve the overall system performance.

BRIEF DESCRIPTION OF THE DRAWINGS

The novel features believed characterics of the invention are set forth in the appended claims. The present invention itself, however, as well as a preferred mode of use, further objectives, and advantages thereof, will best be understood by reference to the following detailed description of a preferred embodiment when read in conjunction with the accompanying drawings, wherein:

DETAILED DESCRIPTION OF THE PREFERRED EMBODIMENT

Figure 1:
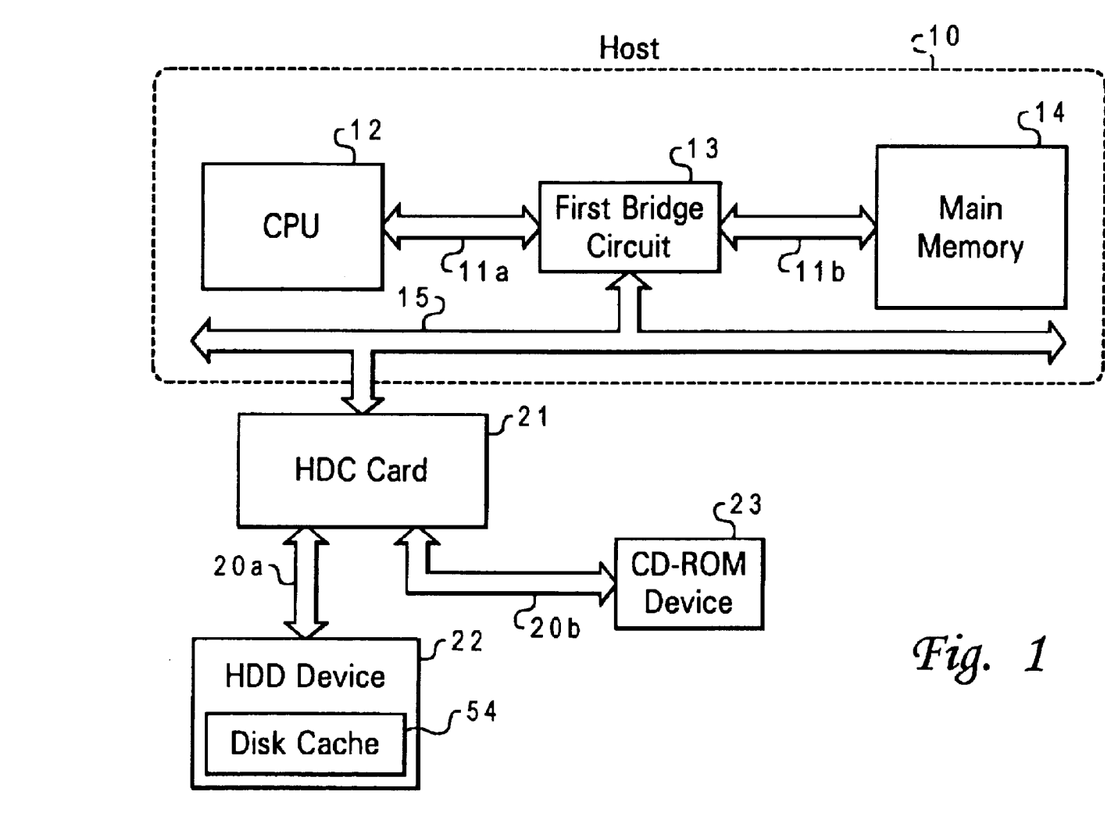
FIG. 1 shows schematically the configuration of a computer system according to a first preferred embodiment.

FIG. 1 depicts the configuration of a computer system according to the first preferred embodiment. As shown in FIG. 1, the computer system includes a CPU 12, a first bridge circuit 13, and a main memory 14 in a host 10. CPU 12 is connected to first bridge circuit 13 through an external bus 11a. First bridge circuit 13 is connected to main memory 14 through an external bus 11b. First bridge circuit 13 also has an expansion bus 15 connected thereto, which is used to attach peripheral devices. First bridge circuit 13 has the functions of, for example, a CPU interface, a memory controller, a clock generator, and a PCI (Peripheral Component Interconnect) bus interface (all not shown). An application program is executed by CPU 12, based on a program stored in main memory 14. A device driver program is also stored in the main memory 14 and instructs an HDD device 22 described below to read/write data independently of the application program.

The expansion bus 15 has an HDC (Hard Disk Controller) card 21 connected thereto. The HDD (Hard Disk Drive) device 22 as an auxiliary storage device (external storage) is connected to the HDC card 21 through a bus 20a, and a CD-ROM device 23 is also connected to the HDC card 21 through a bus 20b. HDC card 21 acts as an external control device for HDD device 22 and CD-ROM device 23, and it is particularly used to expand the control function of HDD device 22 or to install an additional HDD device. HDD device 22 is provided with a disk cache 54 to cache predicted data beforehand so that accesses to a slower medium can be minimized. According to this embodiment, bus 20a is an ATA (AT Attachment) bus, and bus 20b is, for example, a ATA/ATAPI (ATA Packet Interface) bus.

Figure 2:
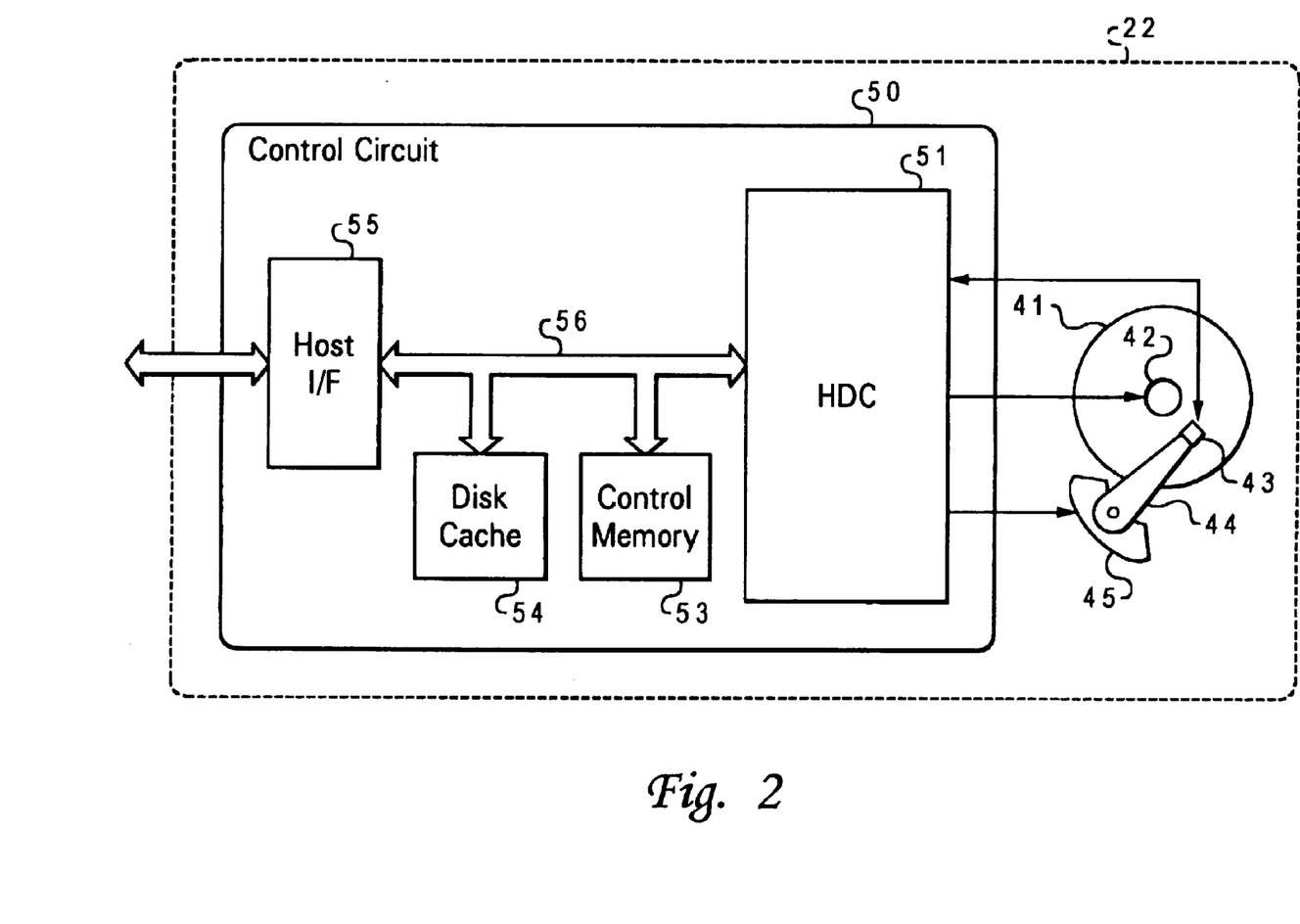
FIG. 2 shows schematically the configuration of the HDD device 22.

FIG. 2 depicts the configuration of HDD device 22. As shown, HDD device 22 includes a magnetic disk 41 for storing data as a storage medium and a spindle motor 42 for rotatively driving magnetic disk 41 as a drive mechanism. A magnetic head 43 performs the data recording/playing (read/write) operations with respect to the magnetic disk 41. A head arm 44 has magnetic head 43 on its end and moves over the recording plane of the magnetic disk 41. An actuator 45 holds and rotatively drives head arm 44. Thus, magnetic head 43 is configured to move on magnetic disk 41 in a substantially radial direction and to access to the recording plane of the magnetic disk 41 at an arbitrary location.

The drive mechanism composed of magnetic disk 41, spindle motor 42, magnetic head 43, and actuator 45 is controlled by a control circuit 50. Control circuit 50 includes an HDC (Hard Disk Controller) 51, a control memory 53, a disk cache 54, and a host I/F 55, and these components are interconnected through a bus 56.

HDC 51 acts as an internal control in HDD device 22 to control HDD device 22 according to a control program and control data stored in control memory 53. HDC 51 performs the arithmetic operation for error control with respect to the servo control and data read/write operations. This causes spindle motor 42 and actuator 45 to be driven and a recording head and a playing head in magnetic head 43 to be operated for the read/write operations. HDC 51 controls to hold in disk cache 54 some of the data recorded on magnetic disk 41 as a recording medium and to read ahead some of the data stored in magnetic disk 41 and hold it in disk cache 54.

Control program executed by HDC 51 and the control data used by the control program are stored in control memory 53. Disk cache 54 acts as a cache memory to temporarily store the write data recorded on magnetic disk 41 as well as to temporarily store the read data read out from magnetic disk 41. Disk cache 54 is constituted by, for example, a DRAM and has a storage capacity of several megabytes to several tens of megabytes. The host I/F 55 is an interface circuit which communicates data or commands with HDC card 21.

Host I/F 55 receives a plurality of predicted requests from HDC card 21 (which is an external controller) as information on look-ahead data which is expected to be read out later. These requests are divided into two types: a non-queue request to be executed immediately and a tagged queue request with a tag to indicate that it is not intended for immediate execution. When a non-queue request is received, HDC 51 immediately starts to read out data from magnetic disk 41 and stores the read data in disk cache 54. When a tagged queue request is received, HDC 51 temporarily holds a plurality of requests in the form of a "queue." The "queue" is ordered so that these requests are executed in order to, for example, minimize each-latency. Thus, the plurality of requests held therein are read out in a different order from the receiving order, taking account of the efficiency in executing them in the order. Host I/F 55 receives a cancel request from HDC card 21. When a command being executed is canceled, HDC 51 creates valid data, which is issued to HDC card 21 through host I/F 55.

Figure 3:
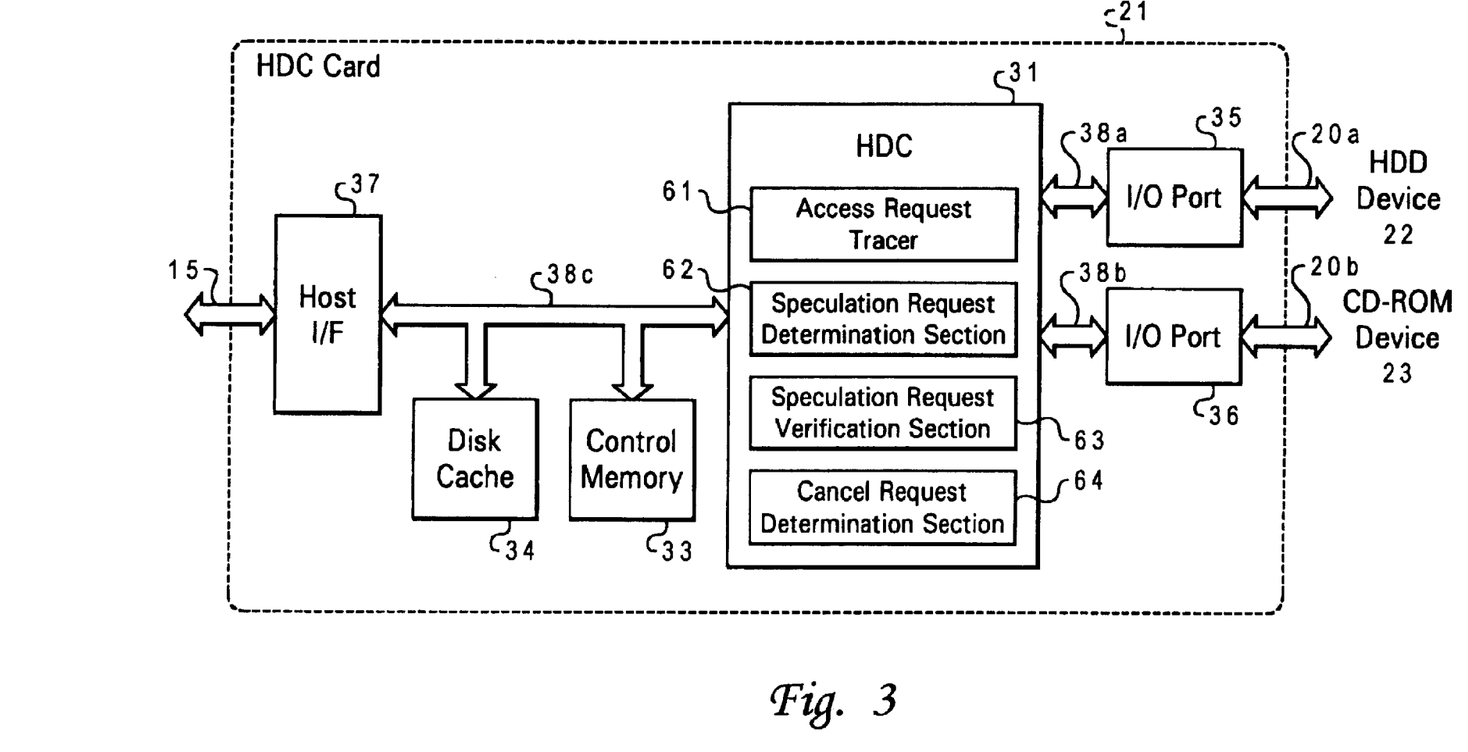
FIG. 3 shows schematically the configuration of the HDC card 21.

FIG. 3 shows schematically the configuration of HDC card 21. HDC card 21 includes an HDC 31, a control memory 33, a disk cache 34, I/O ports 35, 36, and a host I/F 37, and acts as an external controller for HDD device 22. HDC 31, control memory 33, disk cache 34, and host I/F 37 are interconnected through a bus 38c. I/O port 35 is connected to the HDC 31 through a bus 38a, and I/O port 36 is connected to the HDC 31 through a bus 38b. HDC 31 controls the overall HDC card 21 according to a control program and control data stored in control memory 33. HDC 31 controls to hold in disk cache 34 some of the data stored in HDD device 22.

The control program executed by HDC 31 and the control data used by the control program are stored in control memory 33. Disk cache 34 acts as a cache memory to temporarily store the write data written in HDD device 22, as well as to temporarily store the read data read out from HDD device 22. Disk cache 34 is a cache memory located upstream with respect to disk cache 54 provided in HDD device 22 shown in FIG. 2, and it is constituted by, for example, a DRAM and has a storage capacity of several megabytes to several tens of megabytes. HDD device 22 is connected to I/O port 35 through a bus 20a as an auxiliary storage, and CD-ROM device 23 is connected to I/O port 36 through a bus 20b. Host I/F 37, which is connected to the expansion bus 15, is an interface circuit connected to the host to communicate data therewith. When the computer system is started, HDC card 21 communicates setting information with HDD device 22, and HDC card 21 is initialized based on the setting information communicated. According to this embodiment, HDC card 21 is configured to predict data to be requested from the host for improvement of prediction accuracy and to thoroughly analyze a request pattern for precise prediction, such prediction having been carried out by an HDD device 22 alone in a prior system. For this purpose, HDC card 21 is configured to receive a plurality of execution requests issued by the application program in host 10 to HDD device 22 from host I/F 37 as an intact request, that is, a "true access request" which is not modified by collecting or rearranging these requests. The HDC card 21 is further configured to issue a speculation request through I/O port 35 to HDD device 22 based on a true "prediction" as well as to issue a cancel signal described below.

As shown in FIG. 3, HDC 31 includes an access request tracer 61, a speculation request determination section 62, a speculation request verification section 63, and a cancel request determination section 64. Access request tracer 61 receives a command (access request) issued by the application, stores the request, and analyzes the flow of the command for tracing it. Speculation request determination section 62 analyzes the request traced by the access request tracer 61 to actively determine the next request to be transmitted. Speculation request verification section 63 accumulates speculation requests (speculation commands) previously issued to HDD device 22 for analysis and verification. Cancel request determination section 64 is configured to determine a speculation request to be canceled among the previously issued speculation requests in response to the verification result from the speculation request verification section 63. A cancel command is issued based on the determination.

Figure 4:
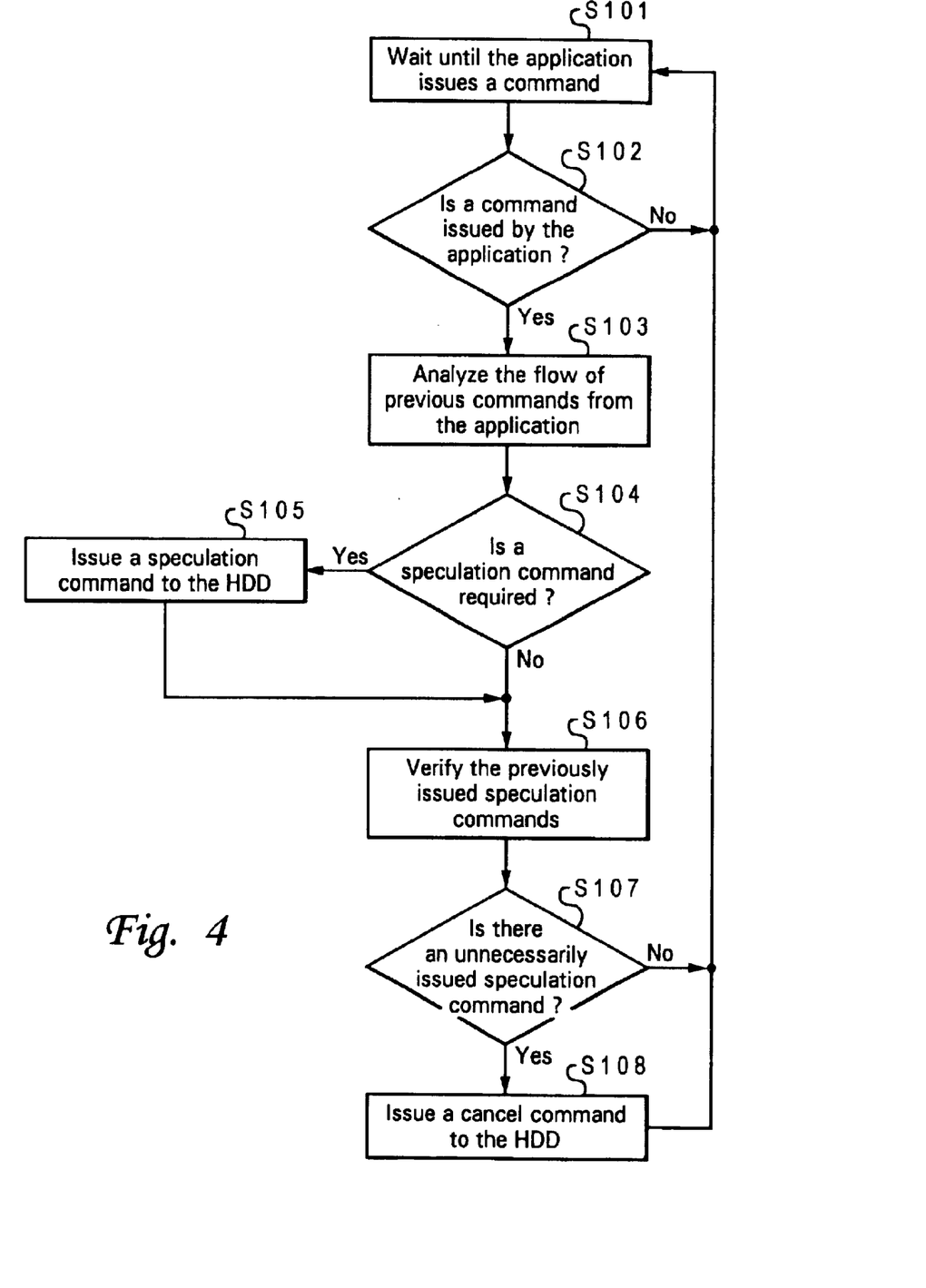
FIG. 4 is a flowchart operation for issuing a speculation command and a cancel command according to the first preferred embodiment.

Now, the flow of operation for issuing a speculation command and a cancel command according to the first preferred embodiment will be described below with reference to FIGS. 1 to 4. FIG. 4 shows the operation of HDC card 21 and communication among the application program, HDC card 21, and HDD device 23.

First, HDC 31 in HDC card 21 waits until the application in host 10 issues a command (step 101). When a command issued by the application is detected (step 102), the flow of previous commands from the application is analyzed (step 103). Namely, access request tracer 61 in HDC 31 constantly monitors a plurality of received true access requests for prediction. If no command issued by the application is detected at step 102, the process returns to step 101 to wait until the application issues a command. After step 103, speculation request determination section 62 determines whether a speculation command is required (step 104). In order to make this prediction, for example, a plurality of access request patterns are stored to determine whether a traced true access request matches these stored patterns. A prior prediction technique may suffice for this embodiment and, for example, a prediction technique with a data read-ahead algorithm called "Look Ahead" can be adopted. If the prediction shows that a speculation command is required to be issued, HDC 31 issues a speculation command to the HDD device 22 through I/O port 35 and bus 20a (step 105). If it is determined at step 104 that no speculation command is required, the process proceeds to step 106 described below.

After HDC 31 issues a speculation command to HDD device 22, speculation request verification section 63 verifies the previously issued speculation commands (step 106). Based on the verification, cancel request determination section 64 determines whether there exists an unnecessarily issued speculation command (step 107). If there exists no unnecessarily issued speculation command, the process returns to step 101 to wait until the application issues a command. If there exists any unnecessarily issued speculation command, a cancel command is issued to HDD device 22 through I/O port 35 and bus 20a (step 108). Thereafter, the process returns to step 101 to wait until the application issues a command, and then the flow of operation for issuing a speculation command and a cancel command is repeated as described above.

It should be appreciated that a non-queue request or a tagged queue request is issued as a speculation command as described above and that if a non-queue request speculation command is issued, some data will be read out from HDD device 22 immediately. Therefore, a cancel command must be issued while bus 20a is used. According to this embodiment, for a cancel command being executed operation of HDD device 22 will be canceled through a function similar to a so-called soft reset. It is preferable that some of the data for a canceled request can be taken advantage of effectively, if the end of valid data is known to the system when the request being executed is canceled. In view of the foregoing, this embodiment allows HDC 31 to know the end of valid data by returning to HDC card 21 the LBA (Logical Block Address) of the last valid data in a blank register after the cancel operation for HDD device 22.

If a tagged queue request is issued and then it is actually executed by HDD device 22, it is continuously recognized by HDC 31. Speculation request verification section 63 verifies a speculation command, taking account of the executed request. If an unexecuted tagged queue request is canceled, a particular tagged queue request among a plurality of requests in the "queue" of HDD device 22 can be canceled by specifying its tag number. Even if a tagged queue request is being executed, it can be canceled in a similar manner to that for a non-queue request. In this case, information on the end of valid data is issued from HDD device 22 to HDC card 21 as described above.

Now, commands used for this embodiment will be described below with reference to specific examples.

Figure 5A:
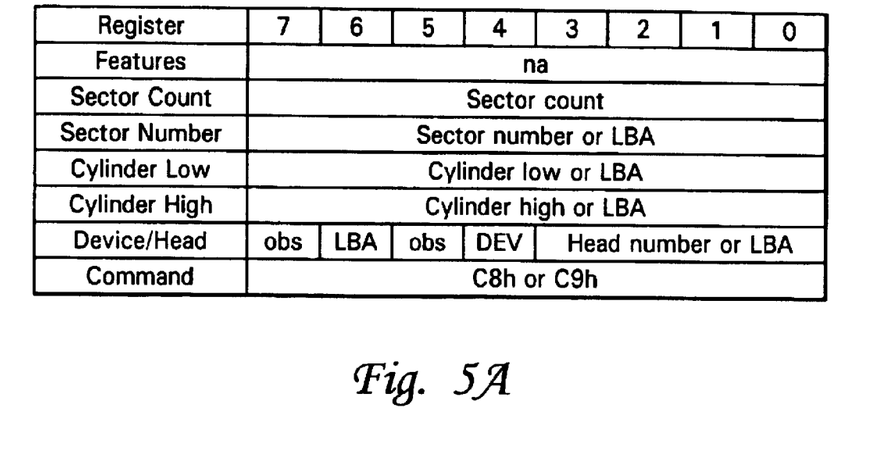
FIGS. 5A and 5B show read command examples in conformity with the ATA interface standard used for the first preferred embodiment.
Figure 5B:
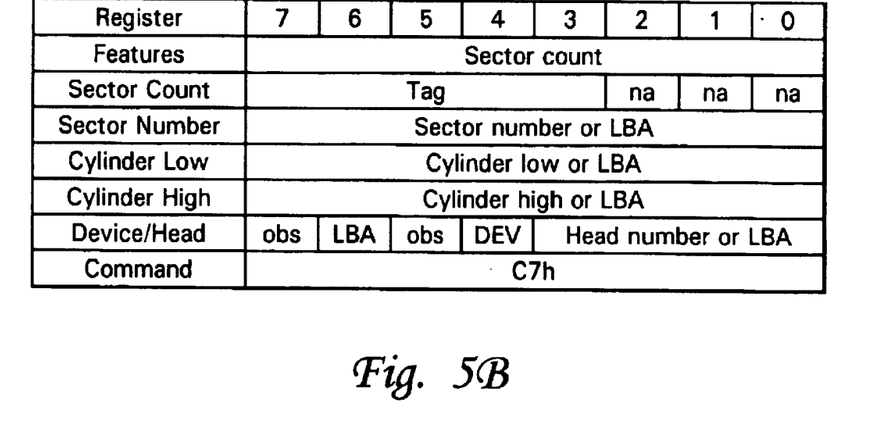

FIGS. 5A and 5B show read command examples in conformity with the ATA interface standard used for the first preferred embodiment. FIG. 5A shows a read DMA (Direct Memory Access) command used for a non-queue request, and FIG. 5B shows another read DMA command used for a tagged queue request. A command block includes registers called Features, Sector Count, Sector Number, Cylinder Low, Cylinder High, Device/Head, and Command, and each register is 8 bits long. All ATA operations are executed by writing an appropriate command code in the Command register. Since the LBA (Logical Block Address) system is used for this embodiment, the LBA system is selected by setting the second bit of the upper four bits in the Device/Head register to 1 "High." Thus, the three bytes of the Sector Count, Cylinder Low, and Cylinder High registers, and the lower four bits in the Device/Head register specify the LBA.

Figure 6A:
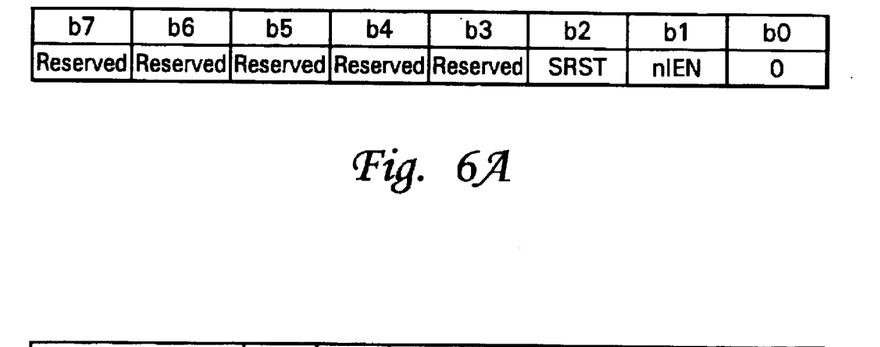
FIGS. 6A, 6B, and 6C show registers and an extended command in conformity with the ATA interface standard used for first preferred embodiment.
Figure 6B:
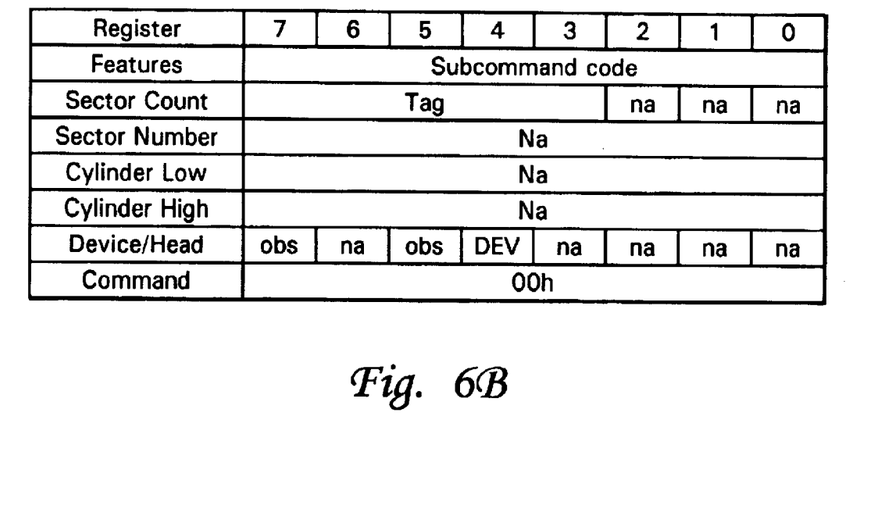
Figure 6C:
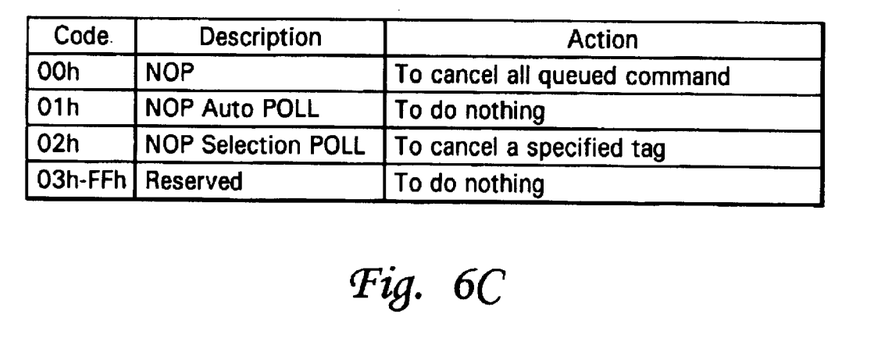

FIGS. 6A, 6B, and 6C show registers and an extended command in conformity with the ATA interface standard used for the first preferred embodiment. This embodiment is configured to cancel a previously issued speculation command through the registers and command. Specifically, FIG. 6A shows the Device Control register having eight bits and all devices are reset by setting the lower third bit "b2" to SRST=1. This embodiment is further configured to cancel only a command being executed through a predetermined blank bit. FIG. 6B shows an improved "No Operation" (NOP) command for this embodiment. A prior NOP command could cancel all queue commands but could not issue an instruction to cancel only a specific command. To overcome this disadvantage, the present invention is configured to specify a tag number to be canceled from a queue with the upper five bits in the Sector Count register, that is, bits 7 to 3 to allow HDD device 22 to cancel an unnecessary access request only. FIG. 6C shows the contents of the Features register in the NOP command shown in FIG. 6B. The code "00h" indicates an action to cancel all commands. The code "02h" indicates an action to cancel a specified tag. Other codes indicate an action to do nothing.

Figure 7:
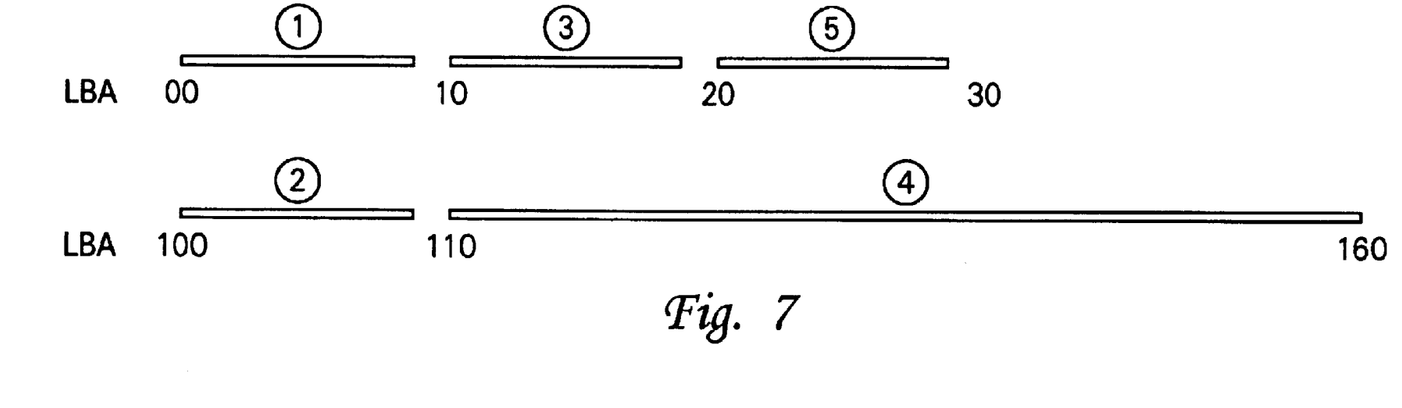
FIG. 7 depicts an overview of an access example.

Now, an access example according to this embodiment will be described below with reference to FIGS. 7 to 9. FIG. 7 depicts an overview of an access example. FIG. 8 shows command examples in the case of non-queue requests issued in the access example shown in FIG. 7. FIG. 9 shows command examples in the case of tagged queue requests issued in the access example shown in FIG. 7.

FIG. 7 shows that (1) a read request for 10 blocks from LBA 0, (2) a request for 10 blocks from LBA 100, and (3) a request for 10 blocks from LBA 10 are issued by the application. Access tracer 61 of HDC 31 shown in FIG. 3 traces requests (1), (2), and (3), and speculation request determination section 62 of HDC 31 predicts from these requests that a request for some blocks from LBA 110 will be issued next. Based on the prediction, a speculation request (4) for 50 blocks from LBA 110 is determined. Contrary to the prediction, however, a read request (5) for 10 blocks from LBA 20 is issued actually.

Next, command examples in the case of non-queue requests issued by HDC card 21 to HDD device 22 in the access example shown in FIG. 7 will be described below with reference to FIG. 8.

Figure 8A:
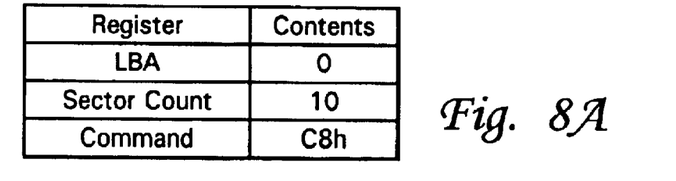
FIGS. 8A–8F show command examples in the case of non-queue requests.

FIG. 8A shows an ATA command (FIG. 5A) issued to HDD device 22 in response to request (1) from the application for 10 blocks from LBA 0. In the figure, all bits in the LBA register are "0" and the Sector Count register shows that the number of blocks is "10." The Command register has a value "C8h" to indicate that this is an action "with retry."

Figure 8B:
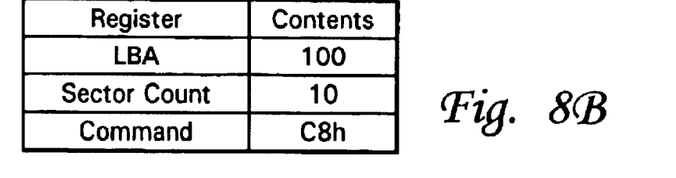

FIG. 8B shows that the LBA "100" and the Sector Count "10" are issued to HDD device 22 in response to request (2), that is., the request for 10 blocks from LBA 100 from the application.

Figure 8C:
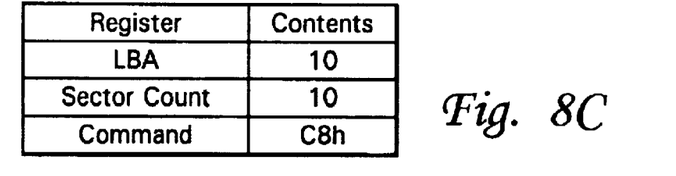

FIG. 8C shows that the LBA "10" and the Sector Count "10" are issued to HDD device 22 in response to request (3), that is, the request by the application for 10 blocks from LBA 10.

Figure 8D:
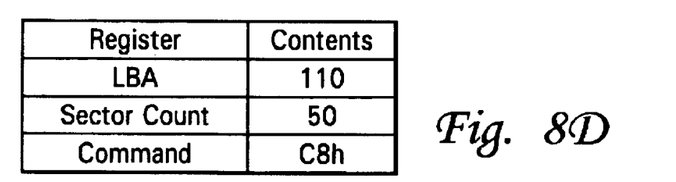

FIG. 8D shows that a request for 50 blocks from LBA 110 is issued to HDD device 22 as speculation command (4) after it is predicted from requests (1), (2), and (3) that a request for some blocks from LBA 110 will be issued next. The values of the LBA "110" and the Sector Count "50" are issued to HDD device 22. As apparent from these command examples, HDD device 22 does not discriminate between a command based on a true access request and a speculation command.

Figure 8E:
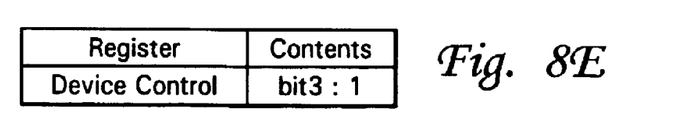

FIG. 8E shows that a command to cancel the request (4) is issued to HDD device 22 in response to the application's request for 10 blocks from LBA 20, contrary to the prediction. For this purpose, for example, the lower fourth bit (bit 3) of the Device Control register shown in FIG. 6A is set to 1. As described above, this embodiment uses a blank bit in the Device Control register to suspend a command being executed as if a soft reset is issued during the command execution. This can suspend a command being executed with respect to HDD device 22 while bus 20a shown in FIG. 3 is used.

The first preferred embodiment is configured to allow HDD device 22 to notify HDC card 21 of the end of valid data among the processed data when the command being executed is suspended. More specifically, an interface similar to the read command used for a non-queue request shown in FIG. 5A may be used to notify HDC card 21 with the LBA of the last valid data specified in the register. This configuration can allow the HDC card 21 to effectively take advantage of some of the data requested by a canceled request in order to improve the overall system performance. It should be appreciated that an arbitrary interface can be selected to report the valid data with the LBA of the last valid data specified in any blank register.

Figure 8F:
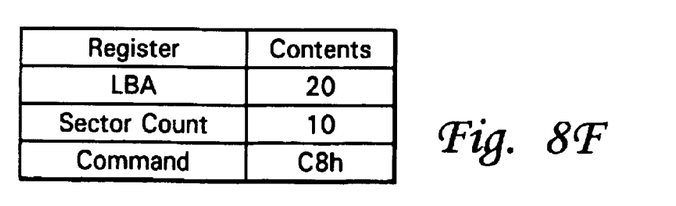

Then, as shown in FIG. 8F, the application's request (5) for 10 blocks from LBA 20 described above is issued to HDD device 22.

Next, command examples in the case of tagged queue requests issued by HDC card 21 to HDD device 22 in the access example shown in FIG. 7 will be described below with reference to FIG. 9.

Figure 9A:
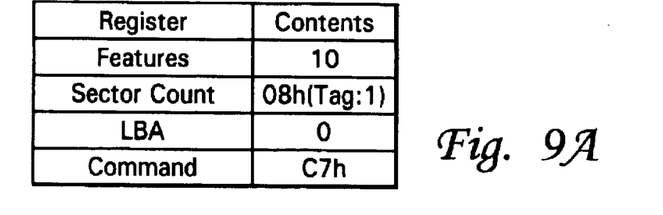
FIGS. 9A–9F show command examples in the case of tagged queue requests.

FIG. 9A shows an ATA command (FIG. 5B) issued to HDD device 22 in response to the request (1) from the application for 10 blocks from LBA 0. The Features register shows that the number of blocks is "10" as a Sector Count. The upper five bits (bits 3 to 7) of the Sector Count register are used to indicate a tag number and thus a value "08h," with s bit 3 set to 1 to indicate the tag number 1. All bits in the LBA register are "0." The Command register has a value "C7h" to indicate that this command is a read DMA queue command.

Figure 9B:
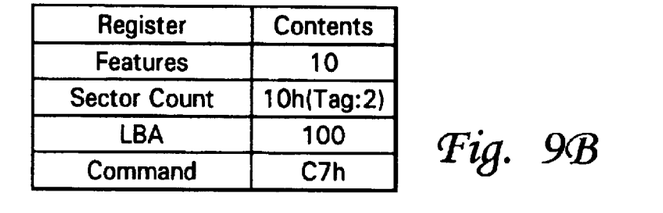

FIG. 9B shows that the Features "10," the Sector Count "10h",with bit 4 set to 1 to indicate the tag number 2, and the LBA "100" are issued to HDD device 22 in response to the request (2), that is, the request for 10 blocks from LBA 100 from the application.

Figure 9C:
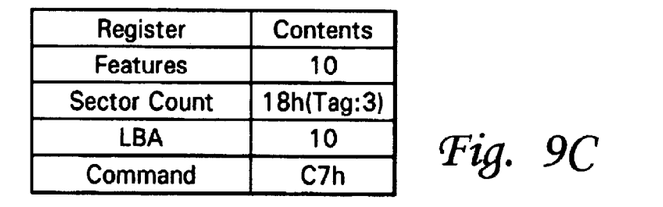

FIG. 9C shows that-the Features "10," the Sector Count "18h" to indicate the tag number 3, and the LBA "10" are issued to HDD device 22 in response to the request (3), that is, the request for 10 blocks from LBA 10 from the application.

Figure 9D:
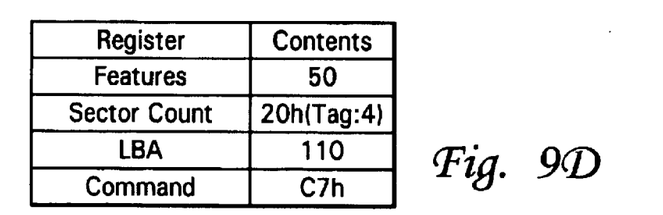

FIG. 9D shows that a request for 50 blocks from LBA 110 is issued to HDD device 22 as the speculation command (4) after it is predicted from the requests (1), (2), and (3) that a request for some blocks from LBA 110 will be issued next. The values of the Features "50," the Sector Count "20h" to indicate the tag number 4, and the LBA "110" are issued to HDD device 22. HDD device 22, which receives these commands, does not discriminate between a command based on a true access request from the application and a speculation command generated by HDC card 21 and holds them as similar ones in a "queue."

Figure 9E:
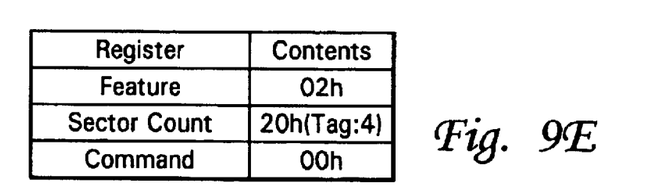

FIG. 9E shows that a command to cancel the request (4) is issued to the HDD device 22 in response to the application's request for 10 blocks from LBA 20, contrary to the prediction. For this purpose, an extended NOP command shown in FIG. 6B is used. Specifically, the value "02h" shown in FIG. 6C is placed in the Features register to note that this command is a request to cancel a selected queue. To specify a queue to be canceled, the Sector Count register has the value "20h" indicating the tag number 4. The value "00h" of the Command register is transmitted to indicate this command is an NOP command.

Figure 9F:
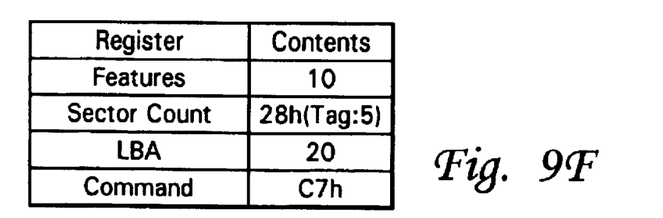

Then, as shown in FIG. 9F, the request (5) from the application for 10 blocks from LBA 20 described above is issued to HDD device 22.

It should be appreciated that a command being executed may be suspended in order to cancel a queue requested by a tagged queue request. For this purpose, the command being executed can be suspended in a similar manner to that for canceling a non-queue request as described for FIG. 8E as if a soft reset is issued during the command execution.

It is advantageous that the LBA of the last valid data can be reported to HDC 21 as described above when the command being executed is suspended, since the data processed until the cancellation can be taken advantage of effectively. This report may be accomplished in a similar manner to that described above.

Thus, according to this embodiment, HDC card 21 can bear some of the tasks previously performed by HDD device 22 to allow HDC card 21 to make an advanced and thorough prediction based on a true request from the application. In particular, when an additional HDD device is installed to improve the accuracy in prediction, advanced control and functional expansion can be accomplished with minimum modification by providing HDC card 21 (e.g., an expansion board) with these prediction and command issuance functions.

In contrast, with the first preferred embodiment in which HDC card 21 (e.g., an expansion board) is used to control the command issuance to HDD device 22, in a second preferred embodiment, the host also includes the function of HDC card 21 and, for example, the main memory mounted on the mother board includes the function of issuing commands to HDD device 22.

Figure 10:
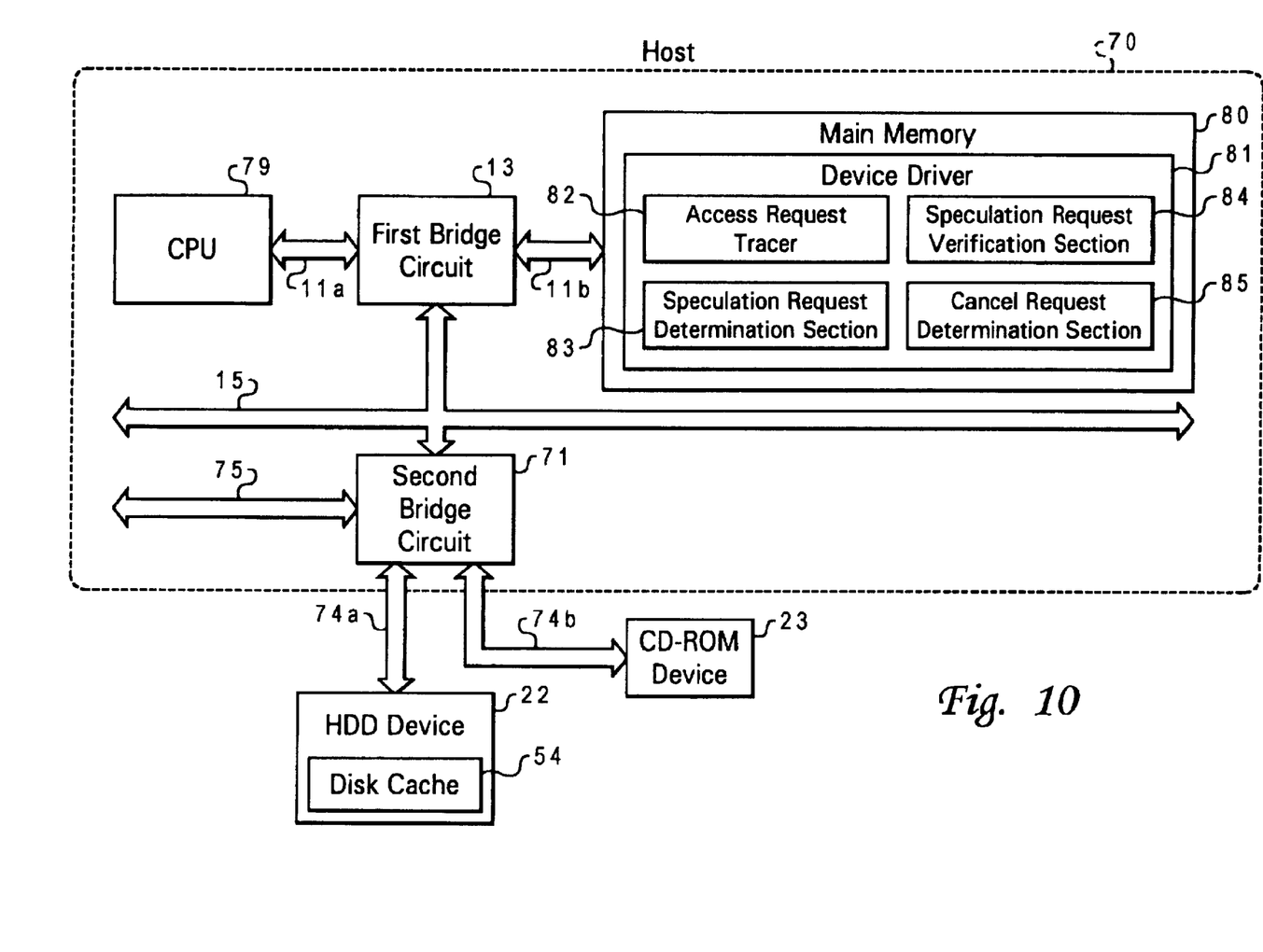
FIG. 10 shows schematically the configuration of a computer system according to a second preferred embodiment.

FIG. 10 depicts the configuration of a computer system according to the second preferred embodiment of the present invention.

It should be appreciated that similar elements to those in the first preferred embodiment have similar numerals and will not be further described herein.

As shown in the figure, the computer system has a second bridge circuit 71 connected to expansion bus 15 in a host 70. Peripheral circuits can be connected to the second bridge circuit 71 through a bus 75. In addition, HDD device 22 is connected to second bridge circuit 71 through a bus 74a, and CD-ROM device 23 is connected to second bridge circuit 71 through a bus 74b. Bus 75 is constituted by, for example, an ISA (Industry Standard Architecture) bus. In the second preferred embodiment, bus 74a is constituted by an ATA bus, and bus 74b is constituted by, for example, an ATA/ATAPI bus.

Second bridge circuit 71 is provided to connect a peripheral device to the expansion bus in conformity with a different standard from that of expansion bus 15. Second bridge circuit 71 has the functions of, for example, a PCI bus interface, an ISA bus interface, a system I/O controller, and a DMA controller.

A main memory 80 communicates data with HDD device 22 according to instructions from a CPU 79. A device driver program 81 is stored in the main memory 80 and instructs HDD device 22 to read/write data independently of the application program. Device driver 81 has the function of an access request tracer 82 for analyzing and tracing an access request made the application program with respect to HDD device 22. It has also the function of a speculation request determination section 83 for analyzing the request traced by access request tracer 82 to actively determine the next command to be requested. It has also the function of a speculation request verification section 84 for accumulating speculation requests (speculation commands) previously issued to HDD device 22 for analysis and verification, based on the determination made by speculation request determination section 83. It has also the function of a cancel request determination section 85 for determining a speculation request to be canceled among the previously issued speculation requests, based on the verification result from speculation request verification section 84.

Device driver 81 issues speculation commands and cancel commands to HDD device 22 in a similar manner to HDC 31 in HDC card 21 described for the first preferred embodiment. Namely, a command issued by device driver 81 is transmitted to HDD device 22 through first bridge circuit 13, the second bridge circuit 71, and bus 74a. HDD device 22 analyzes the command in a similar manner to that for the first preferred embodiment. For a tagged queue request, an access request is held therein in the form of a "queue", and a queue with a specified tag is canceled based on a cancel request. When a cancel command is issued with respect to a command being executed, the command is immediately suspended, and the LBA indicating the end of valid data among the data being processed is returned to device driver 81.

Thus, according to the second preferred embodiment, the host can perform the control operation for HDD device 22 without using an expansion board such as HDC card 21. As compared with providing separate expansion boards, much cost reduction may be accomplished by designing a computer system which allows for expandability of disk devices such as HDD device 22.

As described above, the first and second preferred embodiments, can analyze true requests from the application for analysis of access requests, resulting in "true prediction" made with improved accuracy. In addition, since such a prediction is accomplished by allocating some of the tasks previously performed by HDD device 22 to another device, even a thorough and large-scale prediction can be made without a heavy load on the internal controller of HDD device 22. Thus, effective use of the CPU power and validity of prediction can be improved remarkably. Moreover, according to these embodiments, commands can be issued to HDD device 22 separately for non-queue requests and tagged queue requests and a cancel mechanism for these access requests, can be obtained.

As described above, according to the present invention, the accuracy in prediction can be improved by allowing an external controller to perform a thorough analysis and prediction on true requests from an application to issue a look-ahead request to an HDD or other auxiliary storage.

Any possible performance deterioration which may result from a wrong prediction can be minimized to improve the overall system performance by providing a mechanism to cancel a request being executed or an unexecuted request through an external controller.

While the invention has been particularly shown and described with reference to a preferred embodiment, it will be understood by those skilled in the art that various changes in form and detail may be made therein without departing from the spirit and scope of the invention.

What is claimed is:

1. A controller device provided between an auxiliary storage which stores data and a host device which makes an access request for access to said auxiliary storage, for controlling said auxiliary storage, comprising:
   an access request storage unit for storing past access requests made by said host device;
   a look-ahead request output unit for providing to said auxiliary storage a plurality of look-ahead requests for some data which is expected to be access-requested later, based on the past access requests stored by said access request storage unit, wherein each look-ahead request for data provided by said look-ahead request output unit is a non queue request which is executed immediately or a tagged queue request which is temporarily held in said auxiliary storage in a queue; and
   a cancel signal output unit for providing to said auxiliary storage a cancel signal to cancel a particular look-ahead request among said plurality of look-ahead requests provided by said look-ahead request output unit wherein each cancel signal is a signal to suspend only said command being executed by using a blank bit in a device control register for an ATA-related interface to issue a soft reset.

2. The controller device according to claim 1, wherein a cancel signal provided by said cancel signal output unit is a cancel signal with a tag number to be canceled with respect to said tagged queue request.

3. The controller device according to claim 2, wherein a cancel signal provided by said cancel signal output unit is a command to extend a No Operation (NOP) command for an ATA-related interface with a tag number to be canceled as an argument.

4. A disk controller connected to a disk-shaped storage which stores data and has a cache memory, for controlling said disk-shaped storage, comprising:
   an access request tracer for tracing a true access requests made by an application program executed by a host of said disk-shaped storage, directly from said application program;
   a speculation request determination section for determining speculation requests to be expected later, based on said true access requests traced by said access request tracer;
   an access request issuing section for issuing to said disk-shaped storage a plurality of speculation requests determined by said speculation request determination section wherein each speculation request issued by said access request issuing section is a request to immediately read out data from a medium in said disk-shaped storage and a cancel instruction issued by a cancel instruction issuing section is an instruction to suspend said request being executed;
   a cancel request determination section for determining a particular speculation request to be canceled among said plurality speculation requests issued by said access request issuing section; and
   a cancel instruction issuing section for issuing to said disk-shaped storage a cancel instruction with respect to said particular speculation request determined by said cancel request determination section.

5. The disk controller according to claim 4, wherein said speculation request issued by said access request issuing section is a request for a command held in said disk-shaped storage in a queue with a tag number and said cancel instruction issued by said cancel instruction issuing section is an instruction to cancel a request corresponding to a particular tag number among the requests in said queue.

6. An auxiliary storage comprising:
   a storage medium for storing data;
   a cache memory for temporarily accumulating data read out from said storage medium in response to executing a predicted read request;
   an interface for receiving from an external controller a plurality of predicted read requests with respect to said cache memory with tag number information; and
   a controller for holding a plurality of unexecuted predicted read requests in a queue which includes said predicted read-requests received by said interface and identified by said tag number;
   wherein said interface receives from said external controller a cancel signal with a particular tag number for a predicted read request to be canceled and wherein said interface notifies said external controller which data of the data being read is valid if a request being executed is canceled; and
   wherein said controller analyzes said cancel signal and deletes a particular predicted read request corresponding to said particular tag number from said queue.

7. A computer device comprising:
   a host for executing application programs;

an external storage which has a cache memory and an internal controller, for reading/writing data based on an access request from said host; and a controller for controlling said external storage;

wherein said controller provides to said external storage a look-ahead request for some data which is expected to be access-requested later, based on said access request provided by said host and provides to said external storage a cancel signal to cancel said look-ahead request and wherein said look-ahead request is a request to immediately read out data from a storage medium in said external storage to said cache memory and said cancel signal is a signal to suspend a look-ahead request being executed in response to said request.

8. The computer device according to claim 7, wherein said look-ahead request is a request for a look-ahead request managed by said internal controller in said external storage with an identification number attached thereto and said cancel signal is a signal to specify a particular identification number for a look-ahead request managed by said internal controller to be canceled.

9. The computer device according to claim 7, wherein said external storage analyzes said cancel signal provided by said controller to cancel a look-ahead request and provides to said controller the last valid data information indicating the end of valid data among the data written into said cache memory.

10. A control method for an auxiliary storage, comprising the steps of:

receiving a command issued by an application;

analyzing the flow of said command received from said application;

determining whether a speculation command is required indicating data to be read ahead, based on said analyzed flow of the command;

issuing said speculation command to a queue in said auxiliary storage if it is determined that said speculation command is required;

verifying any previously issued speculation commands in said queue;

issuing a cancel command to said auxiliary storage if it is determined from the verification result that there exists an unnecessary issued speculation command in said queue; and receiving from said auxiliary storage the last valid data information after a cancel command is completed.

11. The control method according to claim 10, wherein said speculation command includes a request to immediately read out data from a medium in said auxiliary storage; and wherein said cancel command suspends said speculation command being executed.

12. The control method according to claim 10, wherein said speculation command includes a request to be held in said auxiliary storage in said queue; and wherein said cancel command selects a particular speculation command among the speculation commands held in said queue and deletes it from said queue.

13. The control method according to claim 12, wherein said speculation command includes a request to be held with a tag number; and wherein, said cancel command specifies a tag number to be canceled.

* * * * *

UNITED STATES PATENT AND TRADEMARK OFFICE
CERTIFICATE OF CORRECTION

PATENT NO. : 6,721,854 B1
DATED : April 13, 2004
INVENTOR(S) : Asano et al.

It is certified that error appears in the above-identified patent and that said Letters Patent is hereby corrected as shown below:

<u>Column 14,</u>
Line 11, please delete the word "a" in between "tracing" and "true".
Line 33, please delete the word "a" before the word "cancel" and replace with the word -- said --.

Signed and Sealed this

Twenty-second Day of March, 2005

JON W. DUDAS
*Director of the United States Patent and Trademark Office*